(12) United States Patent
Topaltzas et al.

(10) Patent No.: US 8,614,731 B2
(45) Date of Patent: Dec. 24, 2013

(54) SYSTEM AND METHOD FOR TESTING THE RECEPTION AND PLAY OF MEDIA ON MOBILE DEVICES

(75) Inventors: Dimitrios M. Topaltzas, Ellicott City, MD (US); Rupert C. Lloyd, Reston, VA (US)

(73) Assignee: Spirent Communications, Inc., Sunnyvale, CA (US)

( * ) Notice: Subject to any disclaimer, the term of this patent is extended or adjusted under 35 U.S.C. 154(b) by 750 days.

(21) Appl. No.: 12/764,753

(22) Filed: Apr. 21, 2010

(65) Prior Publication Data

US 2011/0263243 A1  Oct. 27, 2011

(51) Int. Cl.
*H04N 7/14*  (2006.01)

(52) U.S. Cl.
USPC .......... 348/14.02; 348/14.03; 348/14.04; 348/14.12; 345/1.2; 345/589; 345/619

(58) Field of Classification Search
USPC .......... 348/14.01–14.16, 64, 96–112, 143, 348/180–194, 460, 552; 370/241–271, 370/351–357; 455/403–426.2, 461–466, 455/66.1–67.7, 550.1–560, 575.1–575.9, 455/90.1–90.3; 704/270–278; 709/201–207, 217–248
See application file for complete search history.

(56) References Cited

U.S. PATENT DOCUMENTS

| | | | |
|---|---|---|---|
| 5,446,492 A | 8/1995 | Wolf et al. | |
| 5,504,800 A * | 4/1996 | Yehushua et al. | 379/27.01 |
| 5,596,364 A | 1/1997 | Wolf et al. | |
| 5,940,124 A | 8/1999 | Janko et al. | |
| 5,983,185 A * | 11/1999 | Cuffaro et al. | 704/270 |
| 6,141,042 A * | 10/2000 | Martinelli et al. | 348/181 |
| 6,496,221 B1 | 12/2002 | Wolf et al. | |
| 6,823,302 B1 * | 11/2004 | Atkinson et al. | 704/216 |

(Continued)

OTHER PUBLICATIONS

Younkin et al., "Predicting an Average End-User's Experience of Video Playback", Intel Corporation, Hillsboro, OR, 5 pages.

(Continued)

*Primary Examiner* — Hemant Patel
(74) *Attorney, Agent, or Firm* — Haynes Beffel & Wolfeld LLP; Ernest J. Beffel, Jr.

(57) ABSTRACT

A system and method of determining the quality of audio-visual services of a mobile telephone is provided. In one embodiment, the method includes wirelessly receiving streaming audio-video content at the mobile telephone and wherein the audio-video content comprises video content and audio content. The video content is formed of a plurality of video frames with each encoded with one or more video symbols. The audio content is formed of a plurality of audio segments with each encoded with a sequence of tones. The method further includes outputting the audio content with the mobile telephone and displaying the video content with the mobile telephone. A computer processes the video symbols of each video frame of the displayed video content to determine a video quality of the displayed video content and processes the sequences of tones of the outputted audio content to determine an audio quality of the outputted audio content. The determined audio and video quality is then output by the computer.

19 Claims, 8 Drawing Sheets

(56) References Cited

U.S. PATENT DOCUMENTS

| | | | |
|---|---|---|---|
| 7,023,471 B2* | 4/2006 | Balasubrawmanian et al. | 348/182 |
| 7,050,773 B2* | 5/2006 | Bi | 455/226.1 |
| 7,522,776 B2* | 4/2009 | Kahan | 382/233 |
| 7,680,655 B2* | 3/2010 | Canniff et al. | 704/233 |
| 7,751,450 B2* | 7/2010 | Metaxas et al. | 370/528 |
| 7,843,991 B2* | 11/2010 | Fok et al. | 375/224 |
| 2008/0273861 A1* | 11/2008 | Yang et al. | 386/95 |
| 2009/0147143 A1 | 6/2009 | Sherif et al. | |

OTHER PUBLICATIONS

Draft Spirent Communications press release and press release dated Feb. 10, 2009.

8100 Mobile Device Test System, Spirent Communications dated Dec. 2008.

8100 Mobile Device Test System, Users Manual, Spirent Communications dated 2009.

Corriveau, Official Video Quality Expert Group Minutes, Boston, Apr. 24-28, 2006.

* cited by examiner

SYSTEM AND METHOD FOR TESTING THE RECEPTION AND PLAY OF MEDIA ON MOBILE DEVICES

FIELD OF THE INVENTION

The present invention generally relates to systems and methods for evaluating communication devices, and more particularly to systems and methods for evaluating the performance of reception and play of streaming media by mobile devices such as mobile telephones.

BACKGROUND OF THE INVENTION

As mobile telephones proliferate, and as mobile telephone networks develop, various digital communication services are being introduced, including various data communications services. Many of the data communication services are packet-based data services used to communicate audio content, video content, including streaming audio and video content.

Until recently most conventional streaming media services, such as those available in the home or office, have been delivered via a wire or cable and enjoy a highly consistent transmission quality. In contrast, mobile telephone devices are subjected to use under varying radio environments which results in highly varying transmission quality and thus highly varying data service performance to the end user.

One challenge to those designing mobile telephone devices is to design the telephone devices to provide the desired data quality even when the user is using the telephone device in challenging and changing radio environments. Further, wireless network operators want users of their network to use telephone devices that provide adequate communication quality in all radio environments to ensure that the user has a satisfactory experience using the wireless network.

There are a wide variety of telephone devices capable of receiving audio and video content. With the proliferation of mobile telephone devices, many designs of telephones have evolved. The different designs of telephone devices result in different performance characteristics for each telephone device. Various design characteristics may impact the quality of the data services provided by a telephone device. For example, the radio front-end of a telephone device, which drives, in part, the radiated performance (a device's ability to receive and transmit radio signals) of the device may positively or negatively impact the quality of data communications in various radio environments. Another factor may be the device's capability to cancel interfering radio signals from wanted radio signals in order to improve the signal-to-noise ratio and thereby improve the quality of communications. Other design factors include (a) the performance of the device's digital signal processor, (b) the design of the device's operating system and associated applications including the handling of TCP/IP communications. As a result, the many different mobile telephone devices have varying performance characteristics due to their design. Thus, different telephone devices operating in the same radio environment may provide different qualities of reception and presentation of audio-video content.

A challenge to mobile telephone device manufacturers, and to wireless carriers, is how to evaluate the relative performance of mobile telephone devices for the various packet data services. Another challenge is to objectively compare the communication quality of different mobile telephone devices in a consistent manner. In addition, as the viewing of streaming audio-video content on mobile telephones by consumers becomes ubiquitous, it is ever more important to ensure the quality of reception and play of streaming media content.

A system for testing a telephone device's reception and play of streaming media should (1) generate quality scores that correlate well with human-perceived quality of the playback; (2) be applicable for use in testing all mobile devices that have the capability to play audio-video content; (3) measure the quality of both audio and video output by the telephone device; (4) be easy enough to be used by a test technician with a few hours training; (5) not require custom software or other modifications to the telephone device-under-test; and/or (6) be capable of being used in a moving vehicle.

One or more of these objectives may be provided by one or more embodiments of the present invention.

SUMMARY OF THE INVENTION

The present invention provides a system and method of determining the quality of audio-visual services of a mobile telephone. In one embodiment, the method includes wirelessly receiving streaming audio-video content at the mobile telephone and wherein the audio-video content comprises video content and audio content. The video content is formed of a plurality of video frames with each encoded with one or more video symbols. The audio content is formed of a plurality of audio segments with each encoded with a sequence of tones. The method further includes outputting the audio content with the mobile telephone and displaying the video content with the mobile telephone. A computer processes the video symbols of each video frame of the displayed video content to determine a video quality of the displayed video content and processes the sequences of tones of the outputted audio content to determine an audio quality of the outputted audio content. The determined audio and video quality is then output by the computer.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
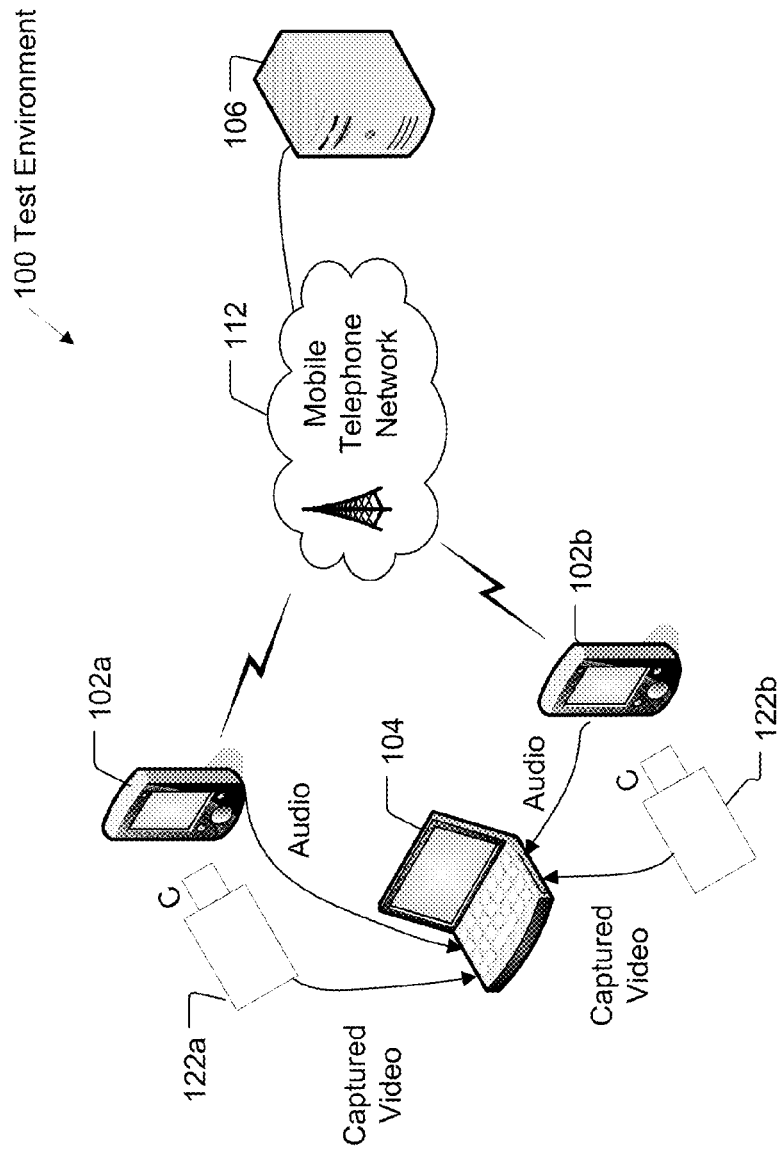
FIG. 1 is a block diagram of an example system for testing the reception and play of streaming media by a mobile telephone device according to an example embodiment of the present invention.

In the following description, for purposes of explanation and not limitation, specific details are set forth, such as particular networks, communication systems, computers, terminals, devices, components, techniques, telephone devices, mobile telephones, accessory devices, simulators, ear pieces, headsets, payloads, telephone handsets, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, telephone devices, mobile telephones, accessory devices, simulators, ear pieces, payloads, headsets, telephone handsets, terminals, devices, components, techniques, data and network protocols, software products and systems, development interfaces, operating systems, and hardware are omitted so as not to obscure the description of the present invention.

According to an embodiment of the present invention, the performance of a mobile telephone device, such as a mobile telephone, is evaluated for the reception and playback of audio and/or video content types. As used herein, "mobile telephone" means a telephone configured to communicate voice and data over a mobile telephone network and which may be handheld or integrated into an automobile. Other telephone devices include mobile telephone accessories (e.g., a wired or wireless) such as an earpiece, headset, speaker phone (e.g., that includes a microphone and which may be, for example, in an automobile, or other device), or other such device. A mobile telephone, also sometimes commonly referred to as a cellular telephone, is a long-range, mobile electronic device used for mobile communications. In addition to providing the standard voice function of a telephone, many mobile telephones support data services such as transmitting and/or receiving audio-video content (including streaming content). A conventional mobile telephone may wirelessly communicate via a cellular network of base stations (cellular sites), which is connected to the public switched telephone network (PSTN). A mobile telephone device thus may include a mobile telephone alone, or in combination with an accessory. Such mobile telephone devices include hardware and software that wirelessly receive data signals and convert the wirelessly received signals to a form and format suitable for an end user application (e.g., convert the received signals to digital data packets). Such hardware and software will determine, in whole or part, the reception and presentation capabilities of the mobile telephone device. Various embodiments of the present invention may be implemented to objectively test and compare such hardware and software of a wide variety of mobile telephone devices.

The present invention may be used to evaluate various data communications such as the reception and play of audio content (e.g., streaming audio such as digital radio), video only content (e.g., streaming video), and audio-visual content (e.g., streaming media having both an audio and video portion). Various performance indicators may be used to quantify the reception capabilities of the tested device. Generally, unless otherwise expressly stated or otherwise implied, the terms "video" and "video content" refers to media content having both a video and audio portion.

As illustrated in FIG. 1, in an example embodiment of the present invention a content server 106 streams audio-video content to mobile telephones 102a and 102b, which receive the streaming audio-video content wirelessly. The video portion of the received content includes a plurality marked video frames. The audio portion of the streamed content includes a plurality of marked audio segments.

Each mobile telephone 102 outputs the audio and the video portions of the received content. A camera 122 captures the displayed video portion as it is output from (i.e., displayed by) the mobile telephone 102 and provides the captured video content to a computer 104. The audio output of each mobile telephone 102 is provided to the computer 104 directly from each telephone 102.

In one embodiment, the video marker of each frame comprises a unique marker that acts as a frame counter for the video frame. The audio markers may include a plurality of sequences of DTMF tones. The computer 104 (or another remote computer system) processes the outputted video (captured by camera 122) and outputted audio to determine the quality of the outputted video portion and audio portion, respectively. More specifically, the computer 104 processes the marked video frames and marked audio segments to determine a quality of the video and audio output by each mobile telephone. Based on the markers in each video frame and audio segment, the computer 104 can identify missing video frames, impaired video frames, and frozen video frames and missing or impaired audio segments. In this example, the quality scores of the first mobile telephone 102a act as reference scores to which the outputs of other mobile telephones are compared (and, in some cases, normalized).

One advantage of the present invention is that the marked video frames and audio segments allow for robust decoding that is suitable in the field where ambient light (e.g., reflections, shadows, etc.) and vibrations would otherwise impair the processing of the output of the mobile telephone. Another advantage is that multiple telephones can be tested simultaneously for comparison and wherein in some embodiments, one of the multiple telephones is used as a reference mobile telephone. Using a reference mobile telephone allows the objective testing of many telephones at different locations and under different environmental conditions. The test results of the various mobile telephones can be normalized against those of the reference telephone. The present algorithm will not be affected by the difference in representation of color space between the original content and the telephone display.

Another advantage is that the test results may be centrally stored in a results database. The results may be accessed for viewing immediately or at some later time by one or more authorized users. In addition, other advantages of some embodiments include that the invention may (1) generate quality scores that correlate well with human-perceived quality of the playback; (2) be applicable for use in testing all mobile devices that have the capability to play audio-video content; (3) measure the quality of both audio and video output by the telephone device; (4) be easy enough to be used by a test technician with a few hours training; (5) not require custom software or other modifications to the telephone device-under-test; and/or (6) be capable of being used in a moving vehicle.

In addition, the objective results may be encoded (and stored) with a time and date stamp of the data reception, a GPS position of the mobile telephone device receiving the data communication, and with information for uniquely identifying the mobile telephone device tested (e.g., the telephone number of the mobile telephone device, International Mobile Equipment Identity (IMEI); model and serial numbers).

The same mobile telephone device may be tested at various locations within a given mobile telephone network. Similarly, different mobile telephone devices and different device configurations for a given mobile telephone may be tested to compare how well different devices and device configurations perform in the network. Further, testing may be performed for different mobile telephone devices in different mobile telephone networks to determine and compare how well the mobile telephone devices perform among the different networks.

Streaming media (i.e., audio-video content) is content sent in compressed form and displayed (and the audio output) by the receiving device (e.g., the mobile telephone) in real time. In other words, the media is sent in a continuous stream of data and is played as it arrives. The receiving user device typically will include an end user application (e.g., a video player) that uncompresses and sends video data to the display and audio data to an audio output device (e.g., a speaker or headphones). A video player can be either an integral part of a browser or a stand alone application.

In contrast to streaming media, progressive downloading of media is a type of media transmission more commonly used over the Internet. For example, almost all of the video content offered by YouTube® comprises video content available for progressive download as of this writing. With progressive downloading, the media content file (e.g., video or audio file) is transmitted, typically stored locally on the device (e.g., buffered), and presented (e.g., video displayed and audio played).

A streaming content server may require a specific or fixed allocation of bandwidth for each stream and can often support only a fixed number of users. Since progressive download is similar to a web page or file being delivered from a web server, there is no specific bandwidth allocated to a particular user. With most streaming servers, content is not downloaded, or cached, on the hard drive as it is with progressive download. Some embodiments of the present invention are concerned with testing the capabilities of mobile telephones to receive and play streaming media content.

Test System Environment

FIG. 1 illustrates an example embodiment of a test configuration suitable for practicing some embodiments of the present invention. The content server 106 may comprise a streaming server (as opposed to a web server) and wherein each stream requires a specific, or fixed, allocation of bandwidth for delivery of the streaming content to the end user device. Other embodiments of streaming servers may also be used. The content streamed may comprise audio content only, video content only, or audio-video content (hereinafter video content). In this example embodiment, the content server 106 streams the video content to mobile telephones 102a and 102b, which receive the streaming video content wirelessly via a mobile telephone network 112 or other wireless network (e.g., WiMAX, IEEE 802.11 network, etc.). As discussed, the video content of the received content includes a plurality marked video frames. The audio content of the streamed content includes a plurality of marked audio segments.

The content server 106 may store a plurality of media files that may include different types of media files such as, for example purposes only, audio, video (such as video having an audio component), and video only files.

A headset (or earpiece) port of each mobile telephone 102 is connected to the computer 104 so that the audio portion (that would normally be output to the user) is supplied to the computer 104 for processing. The audio output port of the mobile telephone 102 may be connected to the computer 104 via an adapter (e.g., that converts analog to digital and/or conditions the audio) or directly connected to the computer 104 (e.g., wherein a sound card may form part of the computer 104 to convert and/or condition the audio). A camera 122 captures the displayed video content as it is displayed by the mobile telephone 102 and provides the captured video content to the computer 104 (e.g., in digital form).

Figure 8:
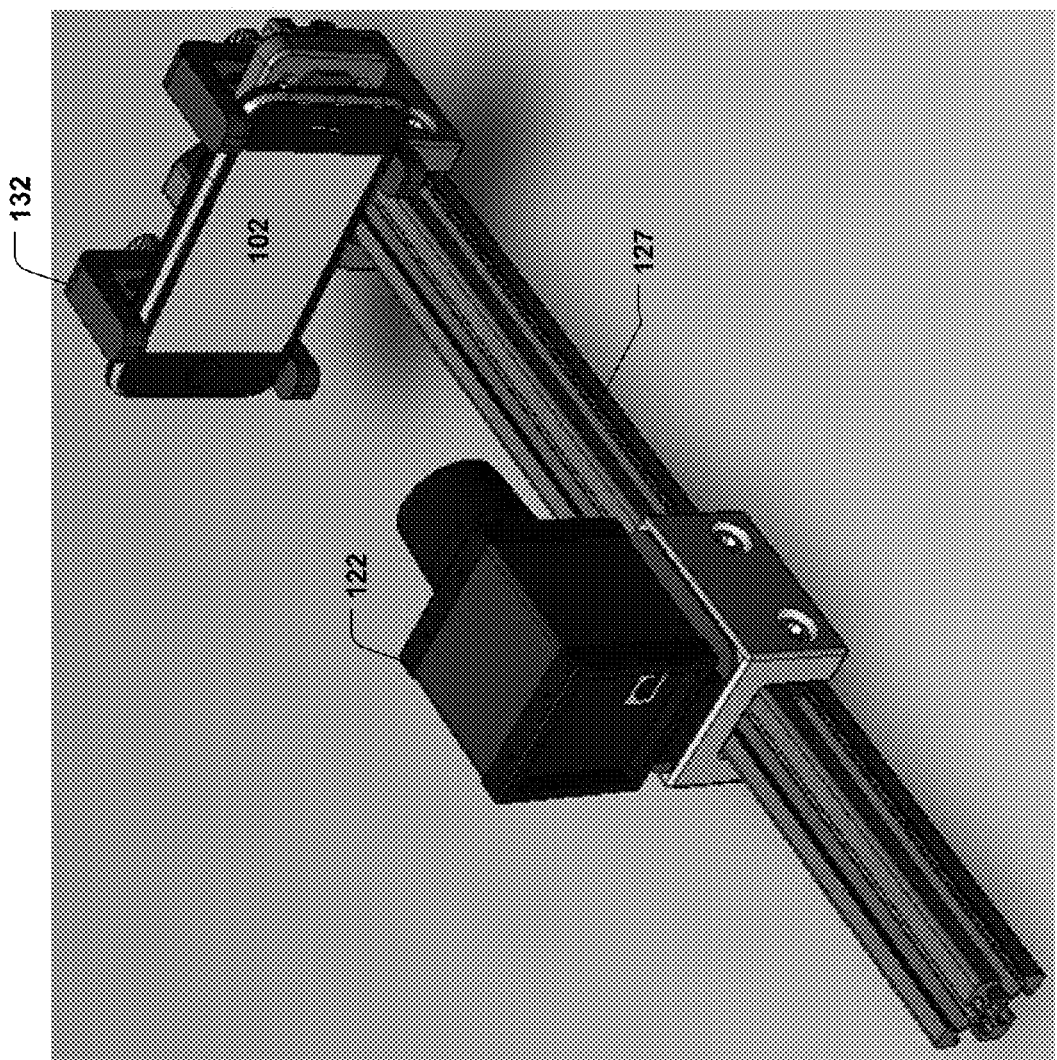
FIG. 8 depicts an example assembly for recording the video content displayed by a mobile telephone according to an example embodiment of the present invention.

As shown in FIG. 8, the mobile telephone 102 may held by a bracket 132 (forming a telephone bracket assembly) that is attached to a rail 127. The camera 122 also may be mounted to the rail 127. Either or both of the telephone bracket assembly and the camera 122 may be slid along the rail so that the camera 122 may be easily adjusted for different mobile telephones 102 to capture the displayed video content.

The computer 104 of FIG. 1 may comprise any computer system suitable for processing the data (which may include one or more computers co-located or distributed) such as a desktop, laptop, notebook, server, or other computer system that may access local or remote memory. In this example, the embodiment the computer 104 processes the captured video data and audio data by processing (e.g., extracting) the unique markers from each video frame and audio segment. In other embodiments, a local computer (e.g., a notebook or other portable computer) transmits the received audio data and video data to a remote computer for processing.

Figure 2:
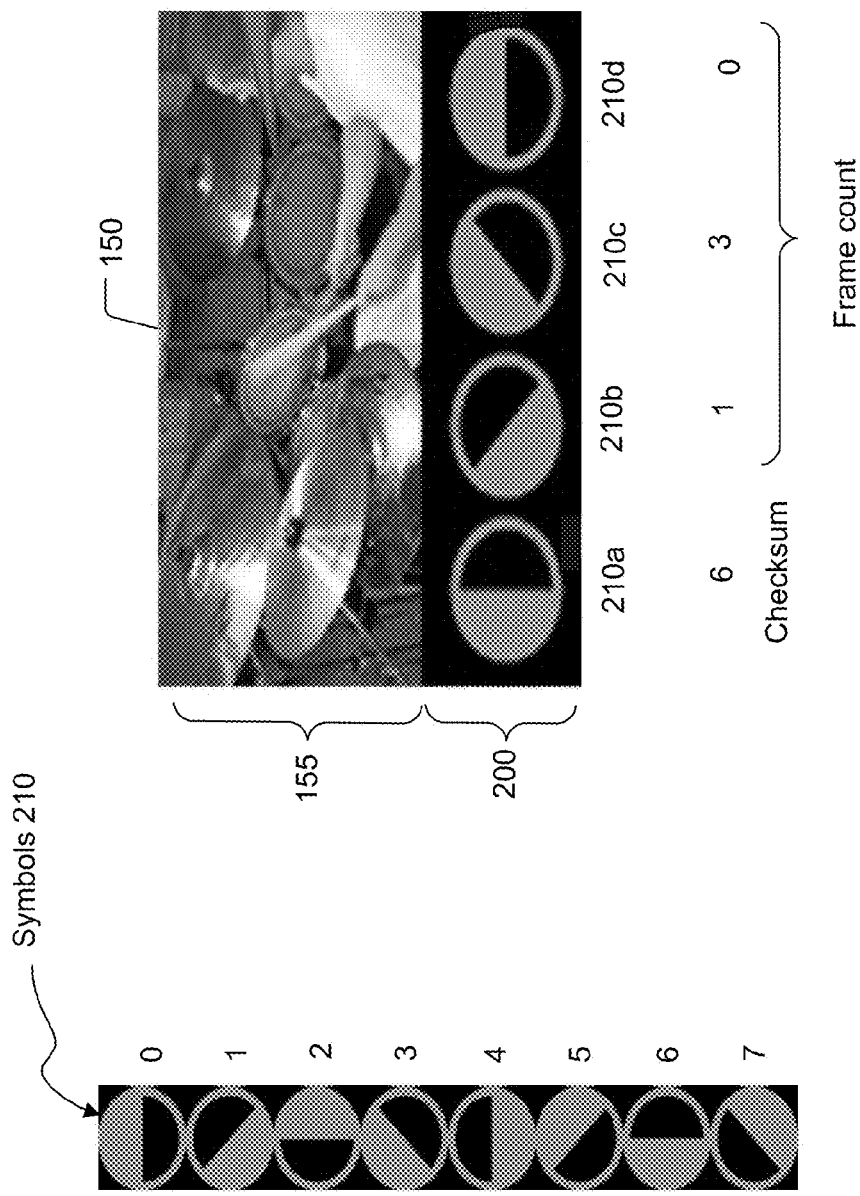
FIG. 2 depicts symbols and a video frame that has been encoded with such symbols according to an example embodiment of the present invention.

FIG. 2a illustrates a plurality of symbols that may be used to mark video frames according to an example embodiment of the present invention. In this example, eight symbols are used corresponding to numbers 0 through 7 as is illustrated in FIG. 2a. FIG. 2b depicts a video frame 150 that has been encoded with a unique marker consisting of four symbols. As is evident from the figure, each marked (displayed) video frame includes a video portion 155 and a separate marker portion 200. The video portion may display conventional video content that, in some instances, has been resized or cropped for the reduced size of the display area of the video portion 155. The marker portion 200 may include a solid background color (which in this example is black) and a unique marker. In this example, the marker portion 200 includes four symbols 210a-d that together comprise a unique combination of symbols. In this example, symbols 210b-d comprise a frame count (in base seven) and represent the numbers one, three, and zero (130). In addition, the first symbol 210a functions as a checksum to verify the number recognized and in this example represents the number six.

While this embodiment uses a frame count as at least part of the marker, other embodiments may use other markers. In addition, while the present invention makes use of green symbols on a black background, other embodiments may use other visually discernible symbols (e.g., squares, triangles) and/or other colors. This example set of symbols has been found to allow robust decoding of the marker in the field and in uncontrolled environmental conditions (subject to vibration and ambient light which may include reflections). In other embodiments, the video marker need not be unique and may be processed by comparing the marker with an expected marker.

Figure 3:
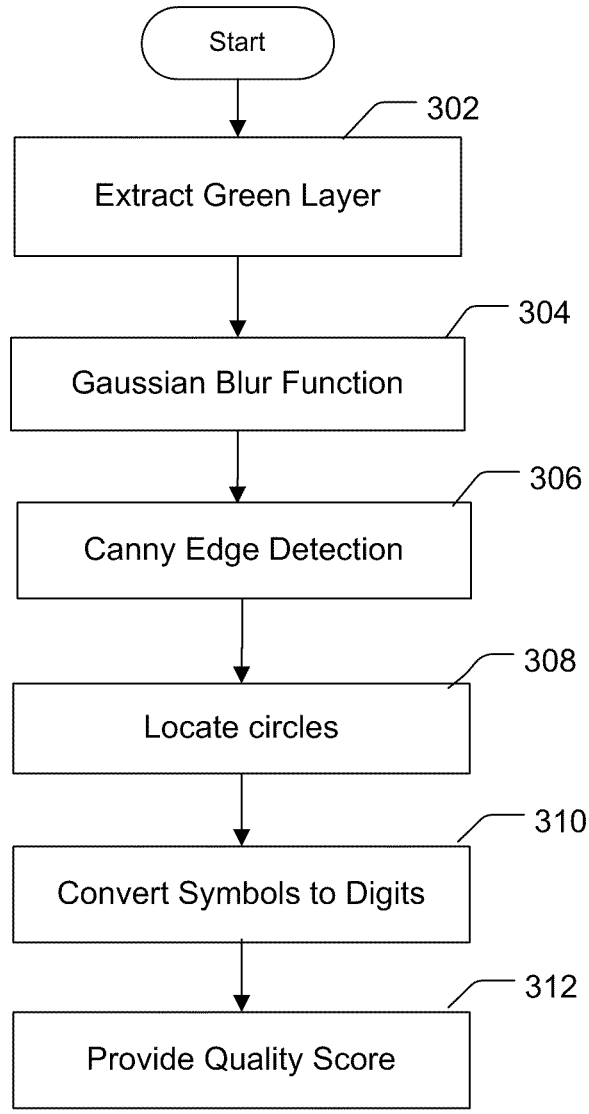
FIG. 3 illustrates an example method for testing the reception and play of streaming video by a mobile telephone device according to an example embodiment of the present invention.

The computer 104 of this example embodiment processes the data of the video frames by attempting to recognize the unique marker present in each frame. FIG. 3 illustrates one example embodiment of extracting the unique marker from each video frame. At 302, the process may include extracting the green image layer from the RGB (red-green-blue) frame. Next, at 304 the green image layer is blurred by a Gaussian function, which may remove some of the image noise.

At 306, the process may include detecting the edges using Canny edge detection followed by locating circles in the image using a Hough transform at 308. The Hough transform may used to find imperfect instances of objects (e.g., circles in this embodiment) within a certain class of shapes such as by a voting procedure. At 310, the half circle symbols are converted to digits (zero through seven) by comparing processed image data from the video frame (i.e., from step 308) to the known symbols. The image data of each symbol may be compared with the image data of the known symbols individually or as a group. If the comparison reveals that the processed image data from the video frame satisfies a similarity threshold with the image data of a known symbol (or symbols), then the symbol(s) is/are recognized and recorded (along with the location if symbols they are processed individually). If not recognized, the marker is determined to be impaired and the impairment is recorded. The location of each symbol, in combination with the value of each symbol, will determine the value of the marker for the video frame (e.g., 6130). The duration that each video frame is displayed may also be measured and compared with a threshold. If the duration of display of a video frame exceeds the threshold, a frozen video frame may then be detected and recorded. At 312, the computer 104 may then provide a report that provides a quality score which may also identify anomalies such as by determining the number (e.g., percentage) of video frames (1) that are out of sequential order, (2) that have an impaired or incorrect checksum, (3) that are displayed for too long of a timer period (indicating a frozen frame), and/or (4) that are not displayed.

As discussed, each audio segment also may be encoded with a unique or semi-unique audio marker. In this example embodiment, the audio stream consists of a plurality of sequences of DTMF tones (dual-frequency tones representing the symbols 01234567890rABCD). For example, a first tone sequence may comprise the DTMF tones of 01234, followed by a second tone sequence that comprises DTMF tones of 56789, followed by a third tone sequence that comprises DTMF tones of 24680. Each tone sequence may be separated from adjacent tone sequences by a predetermined duration of silence. Each audio marker may be unique or sometimes repeated. In addition, in some embodiments a data file stored on the computer 104 may provide timing information which identifies which video frames correspond to which sequence of audio tones. The timing data may be used to determine if the audio and video are synchronized. In addition, in another embodiment, a tone (or tone sequence) may be used to identify the beginning and end of a portion of audio (e.g., music, speech, etc.) to allow testing of the devices ability to receive and output certain forms of media.

Figure 4:
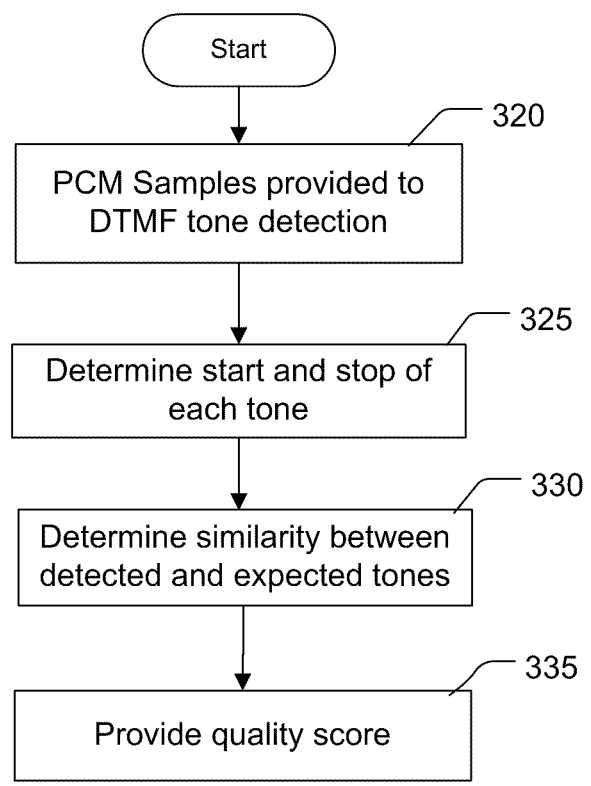
FIG. 4 illustrates an example method for testing the reception and play of streaming audio by a mobile telephone device according to an example embodiment of the present invention.

Upon receiving the audio output from the mobile telephone, the computer may process the audio according to the process illustrated in FIG. 4. Other embodiments may employ other methods of processing the audio. At 320 PCM (pulse-code modulated) samples of the audio are passed through a Goertzel DTMF tone detection algorithm. The Goertzel algorithm is a digital signal processing technique for identifying frequency components of a signal. At 325, the computer determines the start and end of each DTMF tone sequence. As discussed, each tone sequence may be separated from adjacent tone sequences by a period of silence.

At 330 a Levenshtein algorithm may be used to determine the similarity between expected tone sequences and detected tone sequences. In this embodiment, the computer 104 stores a database of tone sequences that can be received. This process identifies the stored tone sequence that most closely matches the received tone sequence and generates a score (e.g., 1-5) that indicates the similarity of the detected tone sequence to the mostly closely matched stored tone sequence. In other embodiments, the process may simply provide an indication as to whether the detected tone sequence satisfies a similarity threshold with an expected tone sequence and provide a score.

At 335, the computer 104 may then provide a quality score for the audio and identify anomalies such as by determining the number (e.g., percentage) of audio segments (1) that are impaired, and/or (2) that are not received as well as indicate an average or mean quality score for each audio segment (e.g., from step 330).

Figure 5:
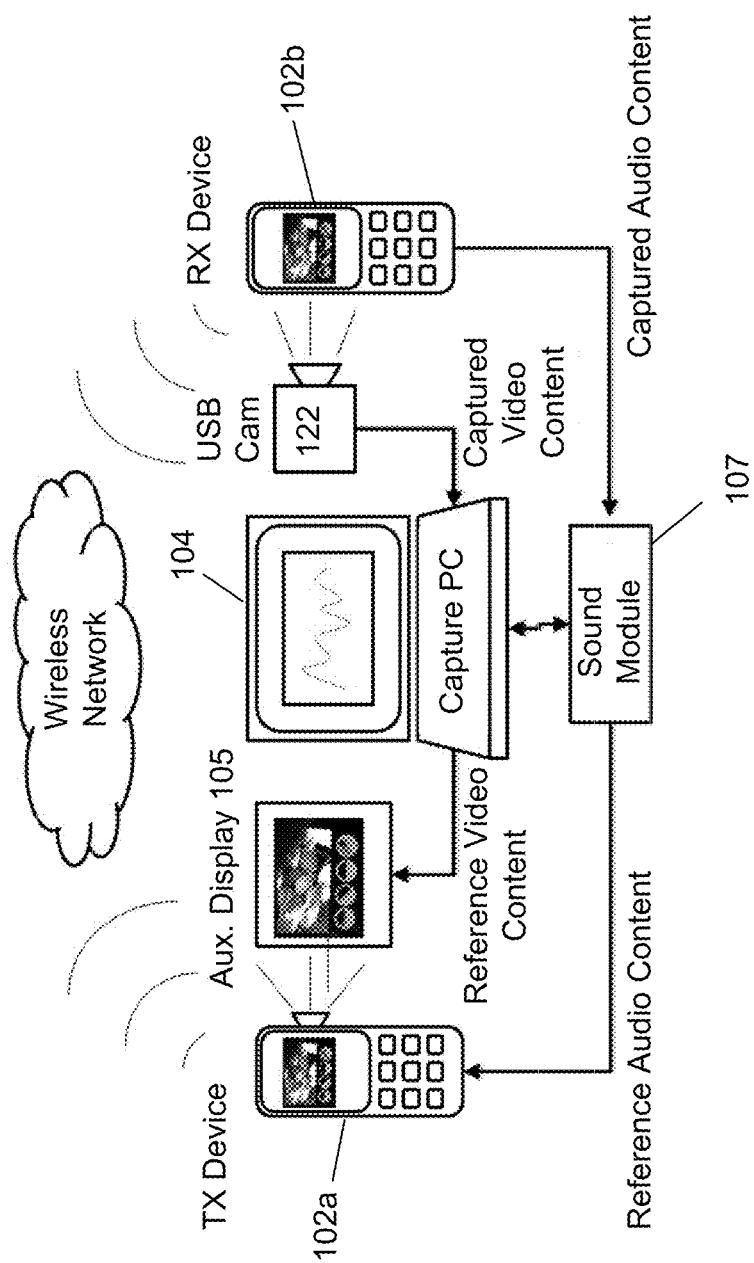
FIG. 5 is a block diagram of another example system for testing the reception and play of streaming media by a mobile telephone device according to an example embodiment of the present invention.

FIG. 5 depicts another example embodiment of a test system environment for testing one or more mobile telephones 102. In the example test configuration of FIG. 5, a first mobile telephone 120a, which includes digital camera, captures the video displayed by an auxiliary display 105 which displays the reference video content (with uniquely marked video frames) received from the computer 104. In addition, the computer 104 supplies reference audio content (e.g., DTMF tone sequences) to an audio input port of the mobile telephone 102a (e.g., headset port).

The first mobile telephone 102a streams the received audio and captured video content to the second mobile telephone 102b via the wireless network (e.g., mobile telephone network and/or another wireless network). The second mobile telephone 102b receives and outputs the streaming audio and video content. The video content displayed by the second mobile telephone 102b is captured by a USB camera 122 that supplies the captured video content to the computer 104. The audio output from the second mobile telephone is output from an audio output port (e.g., headset or earpiece port) and supplied to the computer 104 for processing. The processing of the captured video and outputted audio may be performed as discussed above with regard to FIGS. 3 and 4.

The sound module 107 may take the form of an adapter or sound card that converts audio from the mobile telephone to a format suitable for the computer 104 by, for example, attenuating and performing other conditioning of the signal and/or converting it to digital form. In the embodiment of FIG. 1, the sound card may be integrated into the computer 104 (if it is needed).

The test configuration of FIG. 5 allows the testing of both the transmission and reception of the two mobile telephones 102a,b. Consequently, it may be desirable to use the same mode of mobile telephone for each device 102a,b. The audio and video scores may then be compared to the scores of other mobile telephones having undergone testing in this configuration.

Figure 6:
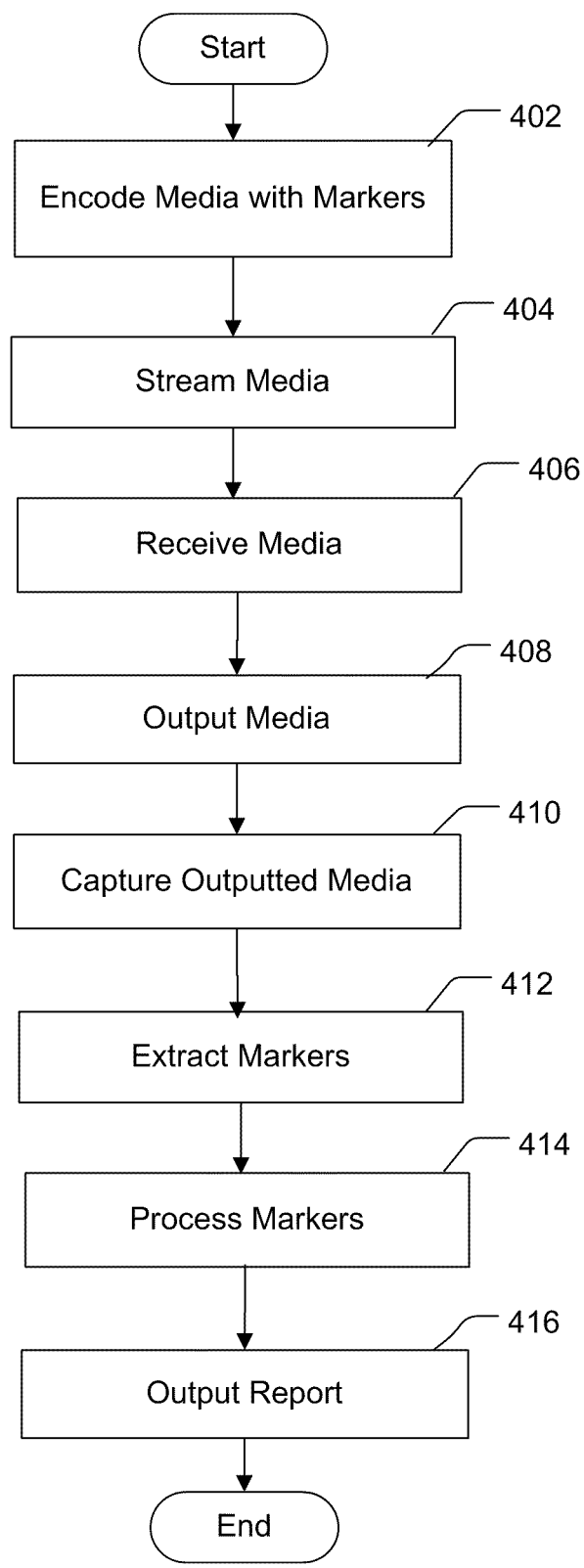
FIG. 6 illustrates an example method for testing the reception and play of streaming media by a mobile telephone device according to an example embodiment of the present invention.

FIG. 6 discloses a process for testing the receiving and output capabilities of mobile telephones according to an example embodiment of the present invention. At 402, the media (audio and/or video) is encoded with markers which may be unique (or unique among a set of markers and wherein the set of markers are repeated in a predetermined sequence).

At 404 the encoded media is streamed (or in an alternate embodiment transmitted) to a mobile telephone via a wireless network. The mobile telephone receives the streaming media at 406 and outputs the received content as it is received at 408. For example, a video player may play the received streaming audio-video content by displaying the video content on the mobile telephone display and outputting the audio content out a headset port. The media output by the mobile telephone is captured at 410, which may include recording the display of the mobile telephone with a video camera to capture the outputted video content which is supplied to a computer 104. The outputted audio content is also supplied to the computer, preferably via an electrical wired or wireless connection (as opposed to being acoustically outputted from the mobile telephone).

At 412 the captured media is processed to extract the audio and/or video markers. The markers are then processed to determine the quality of the media output from the mobile telephone. Process 412 thus corresponds to the processes of FIGS. 3 and 4 although other processes may also be used. At 416 the computer 104 may output a report that graphically and/or textually indicates the quality of the outputted media and which may identify (1) trending percentage of detected video frames, as a fraction of expected frames (normalized 0-5), (2) trending percentage of detected audio markers (e.g., tone sequences), as a fraction of expected markers, (3) the amount of time for which video markers cannot be decoded (i.e., are impaired), (4) the amount of time for which video markers are repeatedly detected (i.e., freeze frame). Specifically, the scoring may be performed for a sliding window (time period) such as thirty seconds. Thus, the output may indicate a percentage of successfully decoded frames (or audio segments) divided by how many frames (audio segments) should have detected during the window and the ratio normalized.

Figure 7:
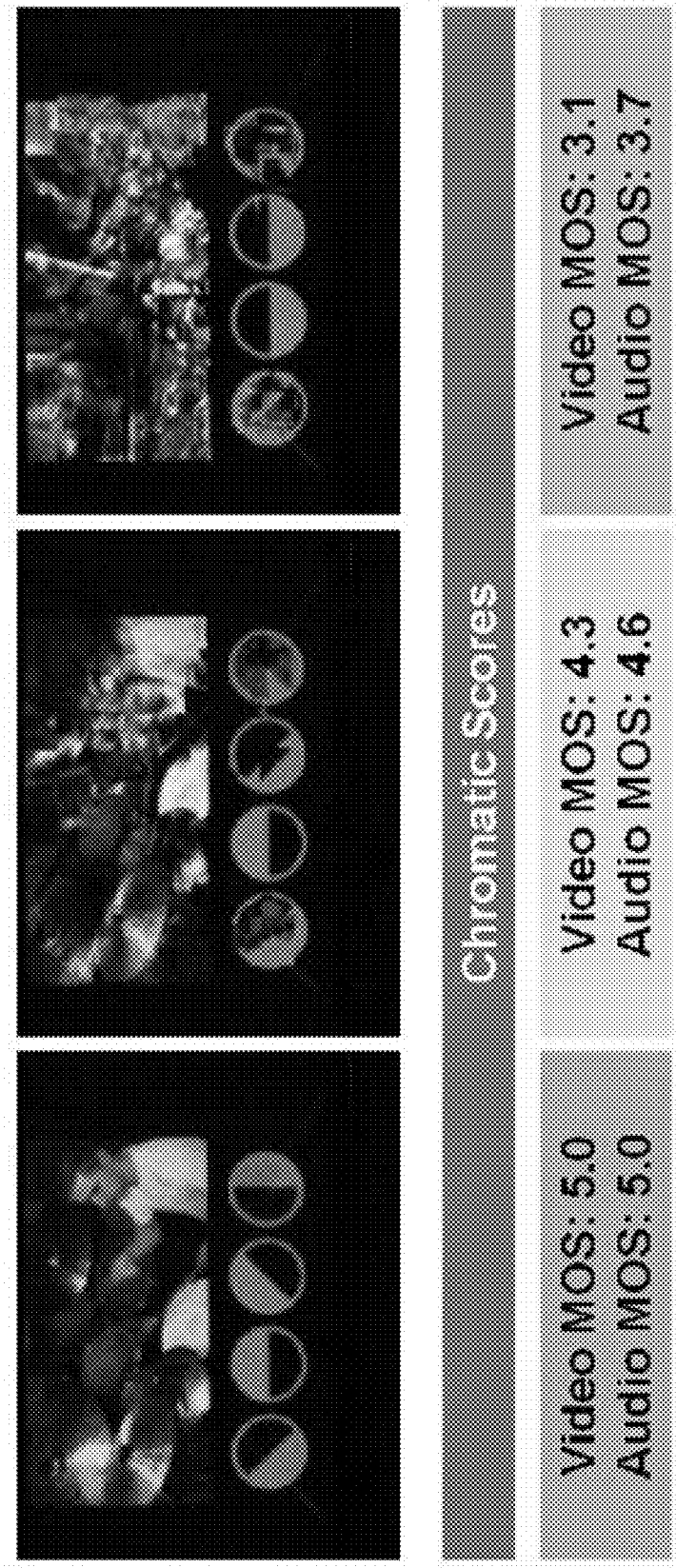
FIG. 7 depicts examples of streamed marked video content that has been received and displayed by a mobile telephone along with associated scoring of both audio and video content, according to an example embodiment of the present invention.

FIG. 7 depicts examples of streamed marked video content that has been received and displayed by a mobile telephone along with associated scoring of both the audio and video portions. As is evident from the figure, in this example embodiment a mean opinion score (MOS) is provided for both the video and audio with the video markers towards the right being more impaired than the marker on the left.

As discussed herein, the mobile telephone may receive the streaming media via a mobile telephone network 112 or other wireless network. The mobile telephone network 112 may be a radio network made up of a number of radio cells (or just cells) each served by a fixed transmitter, known as a cellular site or base station. These cells are used to cover different areas in order to provide radio coverage over a wider area than the area of one cell. An exemplary mobile telephone network 112 may be based on any of various telecommunication standards, such as AMPS, D-AMPS, CDMA2000, GSM, GPRS, EV-DO, UMTS, WiMAX, G1, G1.5, G2, and G3. The communication path also may include an internet protocol (IP) network, a broadband communication network, a Wifi network (e.g., IEEE 802.11a/b/g/n), a WiMAX network, and/or another wired or wireless network coupled to the internet 114 and capable of digital communications (not shown). Thus, the present invention may be used to test the communications of a mobile telephone device provided by its Wifi transceiver (in addition to testing communications of its mobile telephone network transceiver). It is worth noting that the capture process in examples of the present invention is passive and non-intrusive to the operation of the mobile telephone. While the invention is described above in the context of streaming media, the invention is equally applicable to testing the reception and play of progressive downloaded media. While the invention is described above in the context of electronically providing the audio output from the telephone to the computer (e.g., via a wire or Bluetooth®), in other embodiments the audio may be captured acoustically via a microphone connected to the computer.

In one embodiment, the present invention may comprise computer program code products having a tangible computer readable medium containing computer program code for processing the audio and/or video content. Various programs for implementing the test scenario may be stored in memory of the respective computer 104. The software stored on the mobile telephone device, for example, may include a user application for receiving, processing, and outputting the audio and/or video content.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of determining the quality of audio-visual services of a mobile telephone, comprising:
   wirelessly receiving audio-video content at the mobile telephone;
   wherein the audio-video content comprises video content and audio content;
   wherein the video content is formed of a plurality of video frames;
   wherein the audio content is formed of a plurality of audio segments;
   wherein each video frame is encoded with a one or more video symbols;
   wherein each of the plurality of audio segments is encoded with one or more audible markers;
   outputting the received audio content with the mobile telephone;
   displaying the received video content with the mobile telephone;
   processing the one or more video symbols of each video frame of the displayed video content to determine a video quality of the displayed video content, including:
      extracting a color layer from image data representing each video frame;
      blurring the extracted color layer;
      edge detecting the blurred extracted color layer to provide processed image data;
      detecting one or more shapes in the processed image data; and
      decoding the one or more symbols from detected shapes;
   processing the audible markers of the outputted audio content to determine an audio quality of the outputted audio content; and
   outputting an indication of the video quality and the audio quality.

2. The method according to claim 1, wherein each video frame is encoded with one or more video symbols that represents a video frame count.

3. The method according to claim 1, wherein each video frame comprises a video portion and a marker portion that is separate from the video portion; and
wherein the marker portion includes the one or more symbols.

4. The method according to claim 1, wherein said receiving comprising receiving streaming audio-video content at the mobile telephone.

5. The method according to claim 1, wherein each audio segment is encoded with a sequence of tones.

6. The method according to claim 5, wherein said processing the audio markers comprises:
performing DTMF tone detection;
determining a start and stop of each sequence of tones; and
identifying a stored tone sequence that most closely matches the sequence of tones of the audio segment.

7. The method according to claim 1, wherein said processing the one or more video symbols comprises determining a number of impaired video frames and omitted video frames.

8. A method of determining the quality of media services of a mobile telephone, comprising:
wirelessly receiving streaming content at the mobile telephone;
wherein the received streaming content comprises video content formed of a plurality of video frames;
wherein each video frame is encoded with a video marker comprised of a plurality of symbols;
displaying the video content with the mobile telephone;
processing the video markers of the displayed video content to determine a video quality of the displayed video content, including:
extracting a color layer from image data representing each video frame;
blurring the extracted color layer;
edge detecting the blurred extracted color layer to provide processed image data;
detecting one or more shapes in the processed image data; and
decoding the one or more symbols from detected shapes; and
outputting an indication of the video quality.

9. The method according to claim 8, wherein the received streaming content further comprises audio content formed of a plurality of audio segments;
wherein each audio segment is encoded with an audio marker, the method further comprising:
outputting the audio content with the mobile telephone; and
processing the audio markers of the outputted audio content to determine an audio quality of the outputted audio content.

10. The method according to claim 9, wherein each audio marker comprises a sequence of tones.

11. The method according to claim 10, wherein said processing the audio markers comprises:
performing DTMF tone detection to identify tones;
determining a start and stop of the sequence of tones of each audio marker; and
identifying a stored tone sequence that most closely matches the sequence of tones of the audio segment.

12. The method according to claim 8, wherein each video marker includes data representing a video frame count.

13. The method according to claim 8, wherein the plurality of video markers of each video frame is disposed within a solid background color forming a marker portion.

14. The method according to claim 13, wherein the displayed video content comprises a video portion that is separate from the marker portion and that includes video.

15. The method according to claim 8, wherein said processing the video markers comprises determining a number of impaired video frames and omitted video frames.

16. A system for testing a mobile telephone having a display and an audio output port and that receives and outputs media which includes video content comprised of a plurality of video frames, comprising:
a computer;
a video camera connected to the computer for supplying video data thereto;
wherein said video camera is positioned to capture the video content displayed by the display of the mobile telephone;
wherein said computer is programmed to:
process the video content received from the video camera by extracting a video marker from each video frame of the video content displayed by the mobile telephone, including:
extracting a color layer from image data representing each video frame;
blurring the extracted color layer;
edge detecting the blurred extracted color layer to provide processed image data;
detecting one or more shapes in the processed image data; and
decoding the one or more symbols from detected shapes; and
determine a quality of the displayed video based on processing of the extracted markers.

17. The system according to claim 16, further comprising a streaming server configured to stream video content to the mobile telephone.

18. The system according to claim 16, wherein the media comprises streaming media that includes audio content that is output by the mobile telephone,
wherein the audio content is received and output by the mobile telephone and comprises a plurality of audio segments with each audio segment including an audio marker;
wherein said computer is communicatively coupled to the audio output port of the mobile telephone to receive the audio content therefrom;
wherein said computer is programmed to:
process the audio content received from the mobile telephone by extracting the audio marker from each of the plurality of audio segments;
determine a quality of the outputted audio content based on processing of the audio content output by the mobile telephone.

19. The method according to claim 16, wherein determine a quality of the displayed video comprises determining a number of impaired video frames and omitted video frames.

* * * * *